US006840731B2

(12) United States Patent
Figiel et al.

(10) Patent No.: US 6,840,731 B2
(45) Date of Patent: Jan. 11, 2005

(54) COIL HANDLER DEVICE

(75) Inventors: Janusz Figiel, Mundelein, IL (US); Alejandro L. Nocom, Lake Zurich, IL (US); John R. Hartnett, Kildeer, IL (US); Kenneth A. Hoffman, Deerfield, IL (US); Michael J. Brown, Palatine, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 34 days.

(21) Appl. No.: 10/315,724

(22) Filed: Dec. 10, 2002

(65) Prior Publication Data

US 2004/0109749 A1 Jun. 10, 2004

(51) Int. Cl.[7] .......................... B65G 7/00; G66F 11/00; B60B 29/00

(52) U.S. Cl. ....................................... 414/619; 414/426

(58) Field of Search ................................ 414/426, 427, 414/429, 619, 911

(56) References Cited

U.S. PATENT DOCUMENTS

| | | | | | |
|---|---|---|---|---|---|
| 2,706,658 | A | | 4/1955 | Jewell | |
| 2,817,450 | A | | 12/1957 | Ulinski | |
| 2,823,948 | A | | 2/1958 | Horton | |
| 2,951,725 | A | | 9/1960 | St. Jean | |
| 3,044,647 | A | | 7/1962 | Hopfeld | |
| 3,409,156 | A | | 11/1968 | Mills | |
| 3,436,116 | A | * | 4/1969 | Anderson | 414/626 |
| 3,734,328 | A | * | 5/1973 | Dalglish | 414/911 |
| 4,029,230 | A | | 6/1977 | Bolduc et al. | |
| 4,460,210 | A | | 7/1984 | Miechur | |
| 4,515,522 | A | | 5/1985 | Sonerud | |
| 4,531,771 | A | | 7/1985 | Bullock | |
| 4,941,798 | A | * | 7/1990 | Meier | 414/911 |
| 5,642,979 | A | | 7/1997 | Cullen et al. | |
| 6,276,628 | B1 | | 8/2001 | Focke et al. | |
| 6,648,580 | B2 | * | 11/2003 | Lofgren | 414/619 |
| 2002/0054811 | A1 | | 5/2002 | Lofgren | |

FOREIGN PATENT DOCUMENTS

| | | |
|---|---|---|
| WO | WO 93/09054 | 5/1993 |

* cited by examiner

*Primary Examiner*—Gene O. Crawford
(74) *Attorney, Agent, or Firm*—Mark W. Croll, Esq.; Donald J. Breh, Esq.; Welsh & Katz, Ltd.

(57) ABSTRACT

A coil handler device is configured for grasping, lifting and transporting a coil of material that is coiled in such a manner as to have an outer periphery and an inner periphery and to define a longitudinal axis. The handler device includes a frame and a grasping and lifting assembly. The grasping and lifting assembly includes at least one clamping clement having first and second clamping surfaces for engaging and securing the coil along a radial line at the inner and outer peripheries of the coil. The clamping element includes a first clamp leg elongated in a direction along the radial line and a second clamp leg fixedly connected to the first clamp leg transverse to the first clamp leg at a first end. The second clamp leg has a second end operably connected to a lifting assembly for raising and lowering the coil when it is secured by the clamping element. The grasping and lifting assembly includes first and second clamp arms positioned along the first clamp leg for securing the coil at the inner and outer peripheries. The first clamp arm is spaced from the second clamp leg and the second clamp arm is intermediate the first clamp arm and the second clamp leg.

17 Claims, 4 Drawing Sheets

94
22
10
92
96
16
56
90
12
48
46
52
88
42
54
64
50
86
20
40
18
C
C1
26
S
Ac
36
38
36
32
14
C2
C3
C4
C5
C6
C7
30
24
24
34
28
28
24
2
2

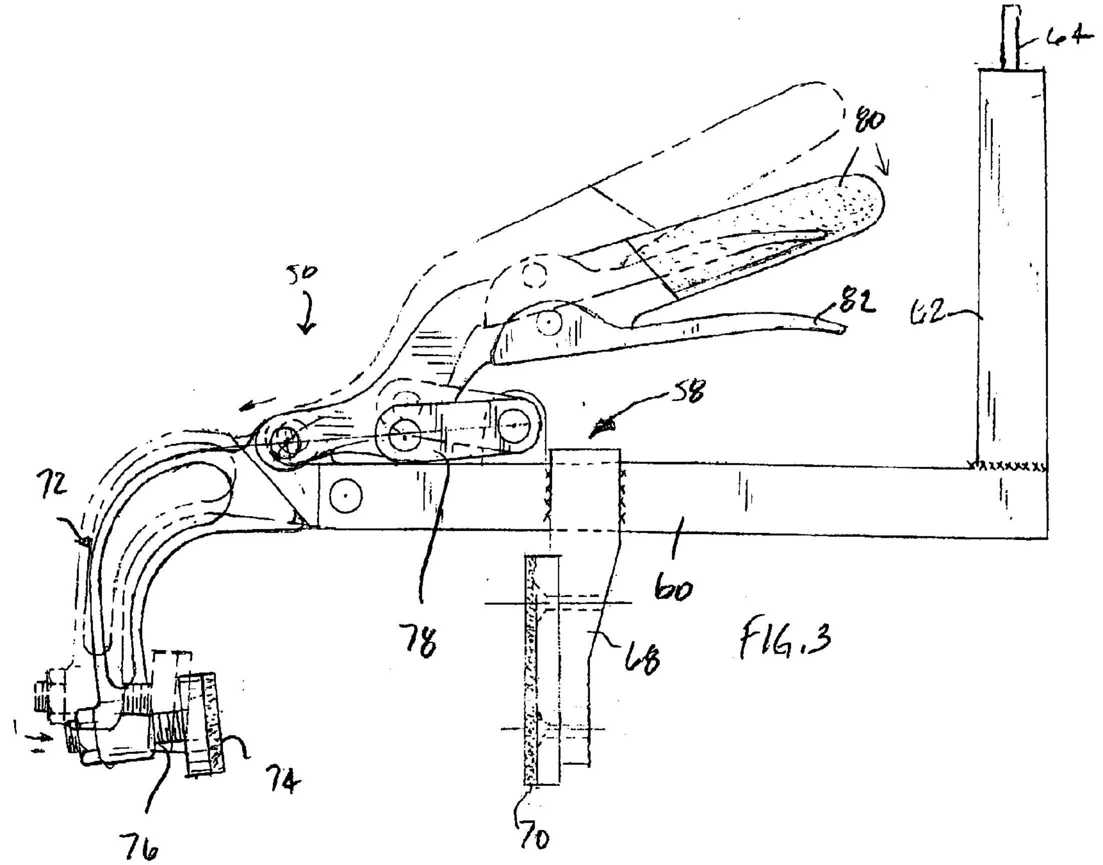
FIG. 3
FIG. 3A
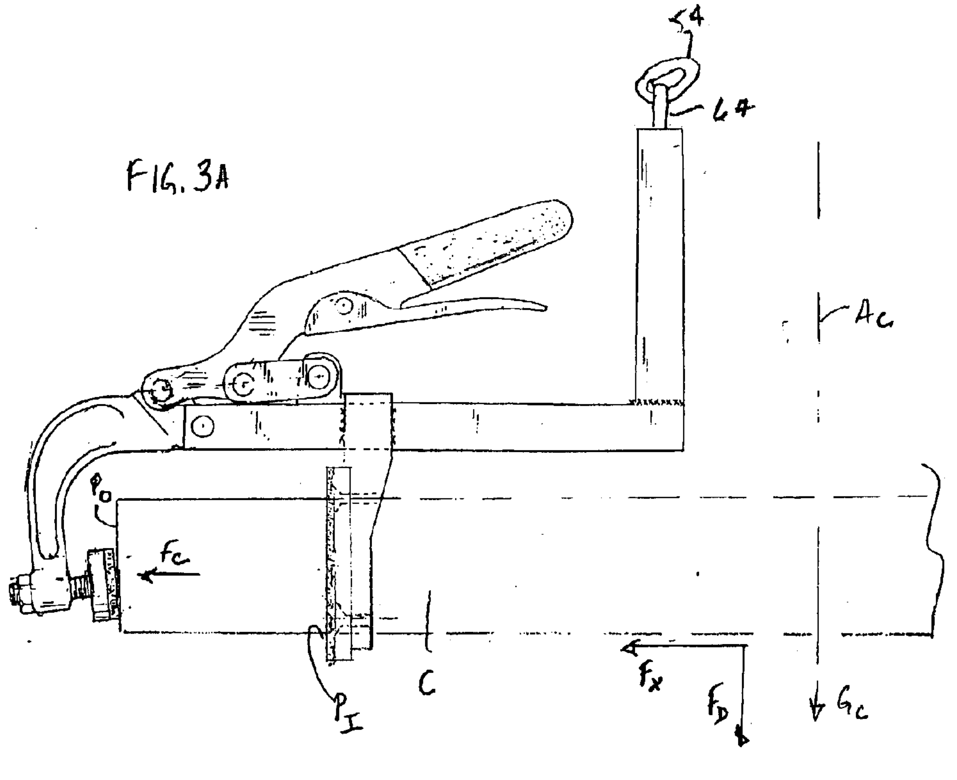

COIL HANDLER DEVICE

BACKGROUND OF THE INVENTION

This invention pertains to a coil handler device. More particularly, the invention pertains to a coil manipulating and transporting device for grasping, lifting and moving coiled materials.

Many materials are supplied in coiled form. For example, strapping material, such as plastic or steel strap is often supplied in coiled form on, for example, a spool or spindle.

In handling coiled strapping material, most strapping machines require that the coils be positioned on a strapping dispenser with the longitudinal axis of the coil in either a horizontal orientation or a vertical orientation. That is, the coil is mounted to the dispenser so that the material feeds from a top or bottom of the coil and so that the coiled material can rotate around a spindle or axis positioned in a horizontal orientation. Alternately, the coil can be mounted so that the material is fed from a side of the coil with the coil axis in a vertical orientation.

Coiled strapping material is often quite heavy and can be bulky, vis-a-vis storage and handling. Many such coils can weigh as much as one hundred pounds or more. As such, it is often difficult to grasp, manipulate and transport the coil to position it in either the horizontal or vertical orientation. Typically, the coil must be manipulated manually to position it on the machine. Moreover, when the coils arc stacked on one another this difficulty in grasping and manipulating the coil is exacerbated.

Coil grasping and manipulating devices are known; however, these devices are large, motorized equipment items akin to a vehicle. Moreover, because of the overall sizes of such devices, their respective costs are likewise high, thus limiting the ability of the “small” volume user to justify purchase and use of such a handling device.

Accordingly, there exists a need for a coil handler that permits grasping, manipulating and transporting coiled material. Desirably, such a device is configured so that it can “straddle” a coil or stack of coils, grasp a coils and remove it from the coil stack. More desirably, such a handler grasps the coil at a plurality of radially spaced locations, but can hold the coil securely with only one location grasped and secured. Most desirably, such a device can be used to grasp a coil with the coil axis in either a horizontal orientation or a vertical orientation, transport the coil and load the coil onto a machine in the orientation for use.

BRIEF SUMMARY OF THE INVENTION

A coil handler device is configured to grasp, lift and transport a coil of material that is coiled in such a manner as to have an outer periphery and an inner periphery and to define a longitudinal axis.

The handler includes a frame and a grasping and lifting assembly. The grasping and lifting assembly includes at least one clamping element having first and second clamping surfaces for engaging and securing the coil along a radial line at the inner and outer peripheries of the coil. In a preferred embodiment, the handler includes three clamping elements.

Each clamping element includes a first clamp leg elongated in a direction along the radial line (of the coil) and a second clamp leg fixedly connected to the first clamp leg. The second clamp leg is mounted transverse to the first clamp leg at a first end. The second clamp leg has a second end that is operably connected to a lifting assembly for raising and lowering a coil secured by the clamping element. In a present embodiment, the clamping elements are mounted to a plate that is in turn mounted to a cable forming a part of the lifting assembly. The clamping elements are mounted to the plate equally spaced from one another.

The clamping elements each including first and second clamp arms positioned along the first clamp leg for securing the coil at the inner and outer peripheries. The first clamp arm is spaced from the second clamp leg and the second clamp arm is between the first clamp arm and the second clamp leg.

Preferably, the clamping elements are operably connected to the plate by a link to permit movement of the clamping element relative to the plate. The plate facilitates preventing the clamping elements from tangling with each other.

In a preferred clamping element the second clamp arm is fixed on the first clamp leg and the first clamp arm is moveable toward and away from the second clamp arm to permit positioning the clamping element over the coil and locking the clamping element onto the coil.

The lifting assembly cable is operably connected to the clamping elements for raising and lower the clamping element. The lifting assembly can be a manually operated assembly, e.g., crank operated, or it can be an assisted movement.

The frame includes a carriage for moving the handler device. In a present embodiment, the carriage includes a plurality of wheels mounted thereto for moving the handler with the coils suspended or supported therefrom.

To facilitate positioning the handler over a coil or stack of coils, the frame includes a base having an open end and an open central region and defining a generally U-shaped base. The clamping elements are suspended vertically above and about centrally of the open central region of the base. The frame can be configured having a boom to suspend or position the clamping elements over the open central region.

In an alternate handler, the grasping and lifting assembly includes a hook element having first and second legs, in which the second leg is configured to engage and secure the coil thereto along a longitudinal line at the inner periphery of the coil. The boom is disposed so as to support the hook therefrom vertically above and about centrally of the open central region. In a present embodiment, the hook is suspended from the plate from which the clamping elements have been removed. The hook can include a detent or stop block to more effectively secure the coil on the hook.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
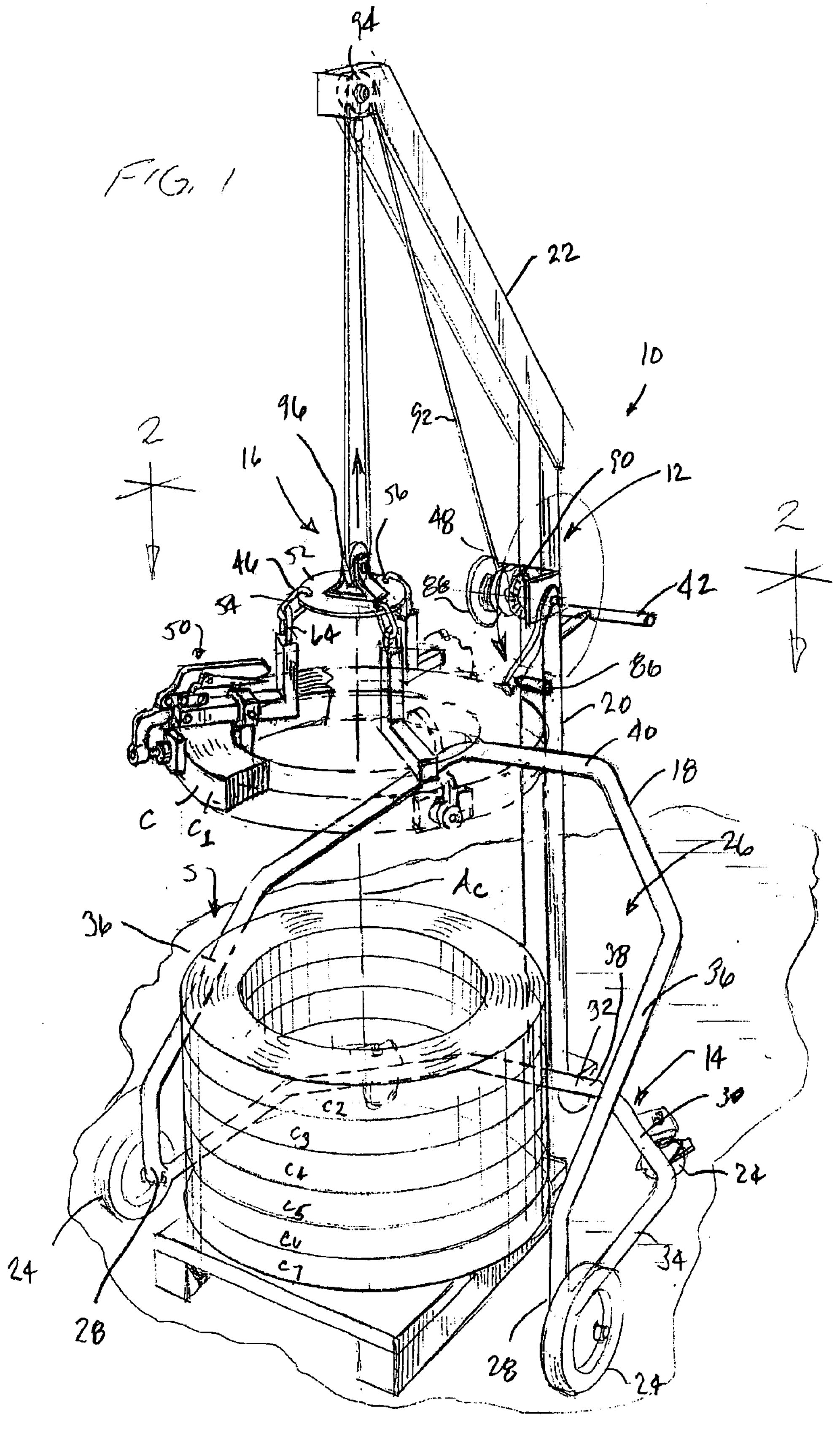
FIG. 1 is a perspective view of one embodiment of a coil handler in accordance with the principles of the present invention, the handler being illustrated with a coil being grasped and lifted from a stack of coils.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. It should be further understood that the title of this section of this specification, namely, "Detailed Description Of The Invention", relates to a requirement of the United States Patent Office, and does not imply, nor should be inferred to limit the subject matter disclosed herein.

Figure 4:
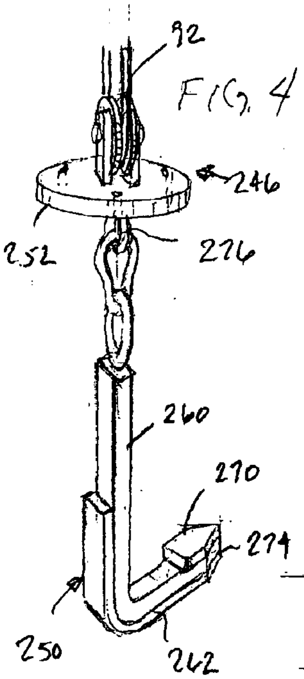
FIG. 4 is an alternate grasping assembly in accordance with the present invention.

Referring now to the figures and in particular to FIG. 1, there is shown a coil handler 10 embodying the principles of the present invention. The handler 10 includes, generally, a frame 12 having a carriage 14, and a grasping assembly and lifting assembly 16. The present handler 10 permits grasping, manipulating and transporting coiled material C. The coils $C_1$–$C_7$, as shown in FIG. 1, can be positioned with the coil axis $A_C$ in a vertical orientation. Alternately, as will be discussed in more detail below, the handler can be configured to grasp, manipulate and transport a coil $C_8$ having its axis $A_{C8}$ in a horizontal orientation (FIG. 4).

As will be recognized by those skilled in the art, materials are generally coiled in a mill wound or a ribbon wound manner. In the mill wind, the material is coiled onto itself or onto a spool in a random manner, without a subsequent wind necessarily overlying a previous wind. In the ribbon wind, the material is positioned to fully overlap or overly a previous layer so that the coil has the same width as the material. The present handler is configured to grasp, manipulate and transport coiled material in either the mill wound or ribbon wound condition.

The frame 12 includes the carriage 14, a mid-support portion 18, a vertical upright 20 and an angled boom 22. Preferably, the carriage 14 includes a plurality of wheels or casters 24 to permit moving the handler 10 without the use of any other transport means, e.g., a wheeled dolly or truck. In a present handler 10, the carriage 14 is formed from tubular material (e.g., steel) having an overall squared-ended U-shape as indicated generally at 26. The wheels 24 are mounted to the carriage 14 at the upper-most ends 28 of the U-legs, at the squared off corners at the juncture of the legs and the base 30, and centrally along the base 32. In the present embodiment, the carriage 14 shape, with the open "top" 34 of the U-shape 26 permits readily positioning the handler 10 over the stack S of coils $C_1$–$C_7$. The number and position of the wheels 24 can, of course, be varied, as can the shape of the carriage 12, to provide a wide variety of carriage shapes and wheel configurations to permit use in essentially any facility environment.

The mid-support 18 can be formed as an integral structure with the carriage 14 and extends upwardly from about the top of the U-legs 28, and rearwardly, essentially following the same shape as the carriage 14. In this manner, the carriage 14 and mid-support 18 structural members arc essentially vertically aligned with one another (i.e., the carriage legs 34 and mid-support legs 36 are aligned with each other as are the carriage base 38 and mid-support base 40) to facilitate positioning the handler 10 over the coil stack S.

The vertical upright 20 extends upwardly from about the center of the carriage base 38. In that the carriage base 38 and mid-support base 40 are aligned with one another, the vertical upright 20, in its upward extension also extends adjacent the mid-support base 40. The vertical upright 20 is secured to the carriage and mid-support bases 38, 40 by, for example, welding or other metal-to-metal joining methods. The vertical upright 20 extends upwardly a distance beyond the mid-support base 40 to a juncture with the boom 22.

Figure 2:
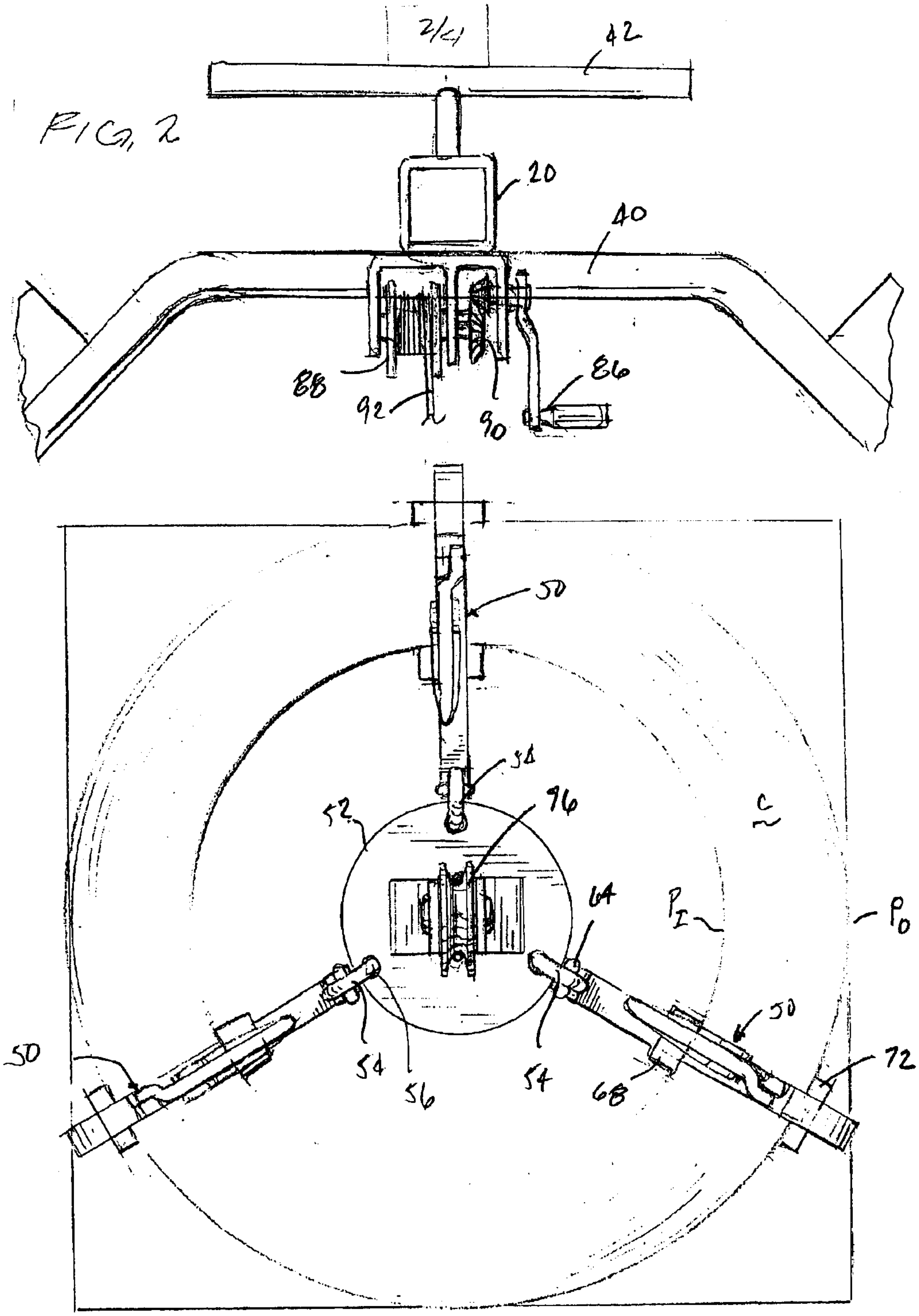
FIG. 2 is a cross-sectional view taken along line 2—2 of FIG. 1 showing the lifting assembly and a portion of the handler frame, and showing the position of the clamping elements as they are engaged with the coil.

The boom 22 extends upwardly and inwardly relative to the vertical upright 20. In a present embodiment, the boom 22 extends inwardly to a point about centrally positioned above the carriage 14 and mid-support 18, within the U-shaped structures. In a current embodiment, the boom 22 is affixed or connected to the vertical upright 20 in a fixed manner, e.g., by welding. However, it is contemplated that the boom 22 can be mounted to the upright 20 by a securable joint so that the boom 22 can be folded down to, for example, store the handler when it is not in use. As seen in FIGS. 1 and 2, a handle 42 extends rearwardly from the upright 20 to facilitate moving the handler 10.

Figure 3:
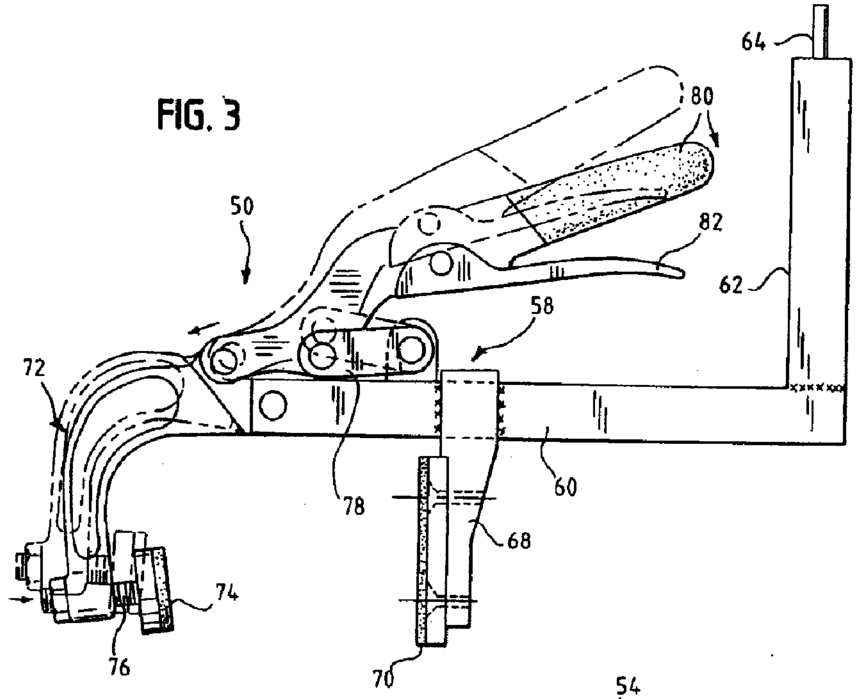
FIG. 3 is a side view of a clamping element, the element being showing in the clamping or engaged condition in solid lines and in the disengaged condition in phantom lines.

The grasping and lifting assembly 16 includes a grasping assembly 46 and a lifting assembly 48. Referring to FIGS. 2 and 3, the grasping assembly 46 includes a plurality of angled toggle clamps or clamping elements 50 that operate or function independent of each other. In one embodiment, each clamp 50 is mounted to a central spacing element or plate 52 by a link 54.

In a present embodiment, the grasping assembly 46 includes three equally circumferentially spaced (i.e., 120 degrees spaced) clamps 50. The links 54 are positioned through openings 56 near the periphery of the plate 52 for securing the clamps 50 to the plate 52.

The clamps 50 include a toggle clamp body 58 having a first clamp leg 60 that is elongated in the direction of force $F_C$ that is applied to the coil C. A second, transverse leg 62 is connected to the elongated leg 60 and includes a free-connecting member 64 for engaging the link 54 to connect to the plate 52. In this manner, as will be discussed below, the locus of engagement indicated generally at 66 of the clamp 50 with the coil C is spaced, both in the direction of force $F_C$, as well as transverse to the direction of force $F_X$, that is applied by the clamp 50 to secure the clamp 50 to the coil C.

As will be recognized by those skilled in the art, the clamp 50 includes a fixed arm 68 having a resilient clamping pad 70 and movable arm 72 also having a resilient clamping pad 74. The movable arm 72 is movable (to move the pad 74) between a first or open position (shown in dotted or phantom lines in FIG. 3) in which the clamp 50 is readily positioned on the coil C and a second or closed position (shown in solid lines in FIG. 3), in which the arm 72 engages the coil C. An adjusting element 76, such as the exemplary adjusting bolt, can be positioned on the clamp 50 to provide a desired grasp (i.e., compression) on the coil C to secure the coil C in the clamp 50. In a current embodiment, the adjusting bolt 76 is positioned on the movable arm 72 to provide adjustable movement of the pad 74. The clamp 50 includes camming links 78 that pivotally connect a handle 80 with the movable arm 72 to move or actuate the movable arm 72 to engage the movable arm pad 74 with the coil C. A release lever 82 permits readily releasing the clamp 50 (i.e., moving the clamp 50 to the open position) to disengage the coil C.

Referring again to FIGS. 1 and 2, the lifting assembly 48 includes a hand-operated crank 86 that is connected to a take-up spool 88 by a gear assembly 90, a cable 92, a pulley or roller 94 located at the upper end of the boom 22, and a pulley or roller 96 mounted to the plate 52. By operating, e.g., rotating the crank 86, the plate 52 (and thus the coil C, if attached), can be raised or lowered as desired. A lock (not shown) can be positioned on the lifting assembly 48 to prevent inadvertently "dropping" the coil C if the crank 86 is let go. Other gearing and roller/pulley configurations can be used to provide a desired "effort" that is required to operate the manual system, which other gearing and pulley configurations arc within the scope and spirit of the present-invention. Moreover, although a manual crank 86 assembly is illustrated, it is anticipated that an assisted, e.g., motorized, electrically operated or the like, actuator can also be used for raising and lowering the coil C. All such operators, whether manual or assisted are also within the scope and spirit of the present invention.

In use, the handler 10 is positioned over the coil C or coil stack S. The grasping assembly 46 is lowered onto the coil C, or the top coil $C_1$ of a stack S of coils. The clamps 50 are positioned on the coil C with one of the arm pads 70 on an inner periphery $P_1$ of the coil C and the other arm pad 74 positioned radially opposingly, on an outer periphery $P_O$ of the coil C. As set forth above, the clamps 50 are positioned equally circumferentially spaced from one another, so with a grasping assembly having three clamps 50, the clamps 50 are positioned 120 degrees spaced from one another. The clamp handles 80 are urged toward their respective first legs 60 to close and secure the clamps onto the coil C.

Once the clamps 50 are positioned around the coil C and secured to the coil C, the coil C can be lifted using the lifting assembly 48. When the coil C is raised to a desired level or height, the lifting assembly 48 is locked (to prevent the coil C from inadvertently "falling") and the handler 10 can be moved to position the coil C at a desired location to, for example, load the coil C onto a strapping machine (not shown).

Advantageously, it has been found that even though the present handler 10 is configured with a plurality of clamping elements 50 (three as shown), the handler 10 will support a coil C of material in a generally vertical (axis $A_C$) orientation, even with only a single clamping element 50 securing the coil C. That is, even if only a single clamp 50 is locked onto the coil C, the coil C will remain secured by the clamp 50 and will remain in a substantially vertical (axis $A_C$) orientation, that is, the coil C will remain in substantially the orientation as illustrated in FIG. 1.

Particular, exemplary design considerations that enhance the ability of the handler 10 to secure the coil C with a single clamp 50 and maintain the coil axis Ac substantially vertical are the position of the clamp 50 and clamp pads 70, 74 relative to the inner and outer peripheral surfaces $P_1$, $P_O$ of the coil C, the transverse clamp leg 62 and the freely moving connection of the clamp 50 to the plate 52.

Figure 3A:
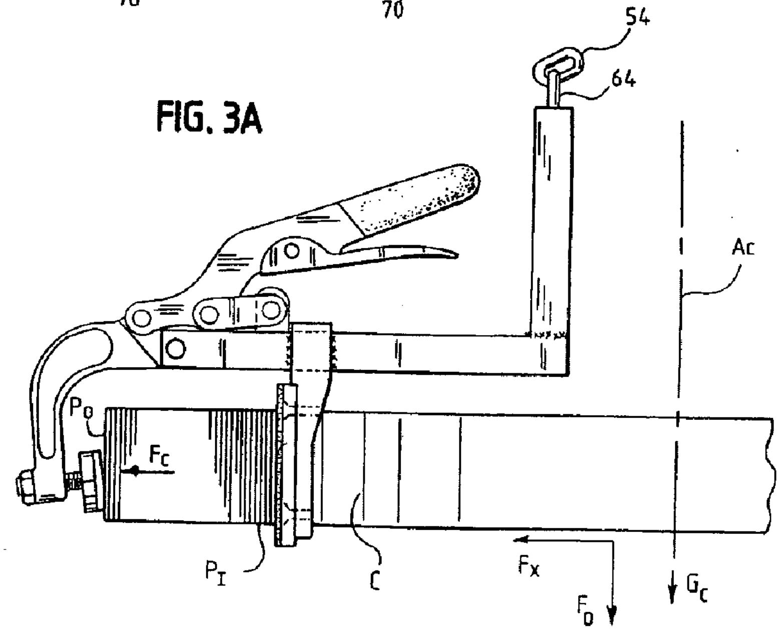
FIG. 3A is a force diagram of the clamping element engaged with a section of the coil, showing the various forces, including the force exerted by the clamp and the force exerted on the clamping element by the weight of the coil.
Figure 4:
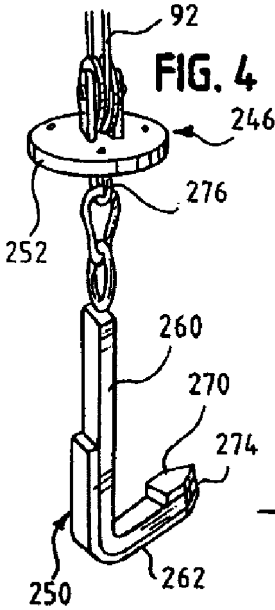
Figure 5:
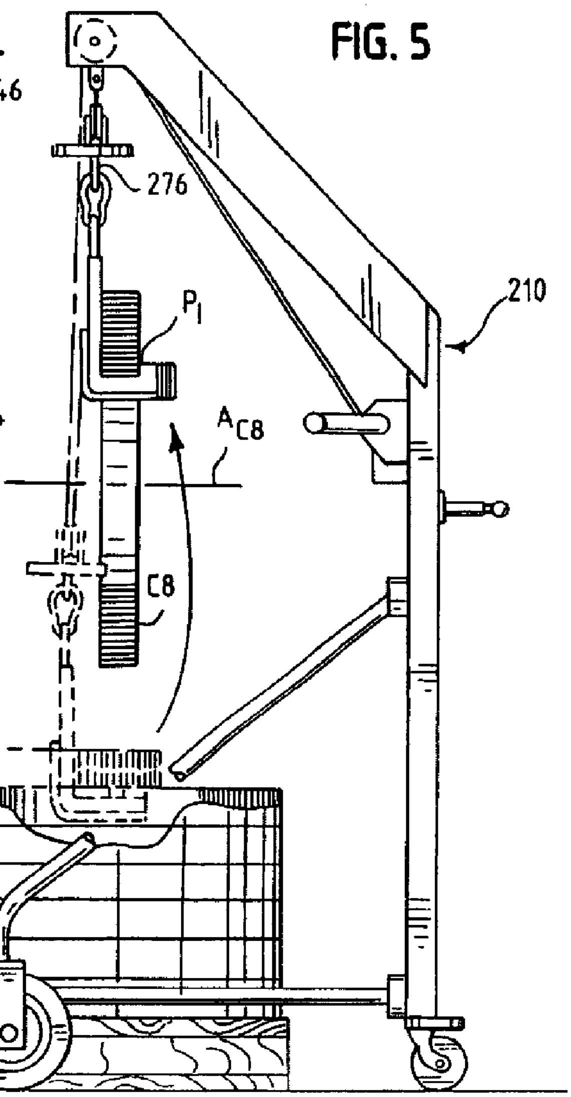
Figure 6:
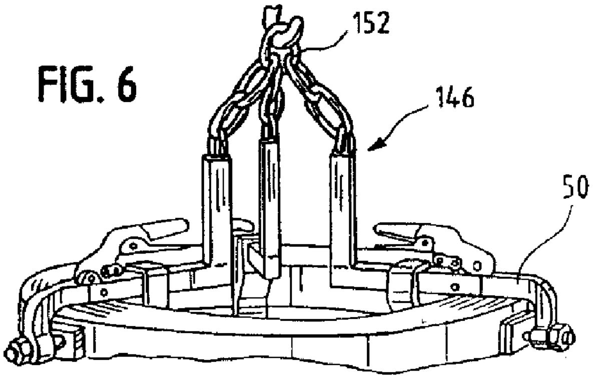

As to the clamp 50 configuration, referring to FIG. 3A, it can be seen that the force $F_D$ applied to the bulk of the coil C is radially into the coil C. As the weight of the coil C "pulls" the coil C down (from about the center of gravity $G_C$ of the coil C), a portion of that downward force is translated into compressive force $F_C$ to urge the coil C against the pad 74, vis-a-vis the position of the pad 74 as it engages the coil C; rather than a downward force that urges or pulls the coil C out of the clamp 50. Essentially, even with only a single clamp 50 holding the coil C, the forces are such that a portion of the force of gravity (exerted at the center of gravity $G_C$) is translated into a force $F_C$ that urges against the pad 74 and secures the coil C in the clamp 50.

With respect to the transverse clamp leg 62 and the freely moving connection 64/54, because the coil C will tend to come to rest with its center of gravity $G_C$ vertically below the first free connection 64 (e.g., the connection between the clamp 50 and the plate 52), the coil C will tend to "balance", that is come to rest at some orientation close to the vertical (axis $A_C$) orientation, rather than to shift so that the coil C rests at a horizontal (axis) orientation. The rigid nature of the connection between the elongated first leg 60 and the transverse leg 62 thus shifts the point or orientation at which the coil C will come to rest. The movable nature of the link 54 connecting the clamp 50 and the plate 52, however, provides the desired flexibility or maneuverability of the clamp 50 relative to the coil C so as to permit readily securing the clamp 50 to the coil C.

Figure 6:
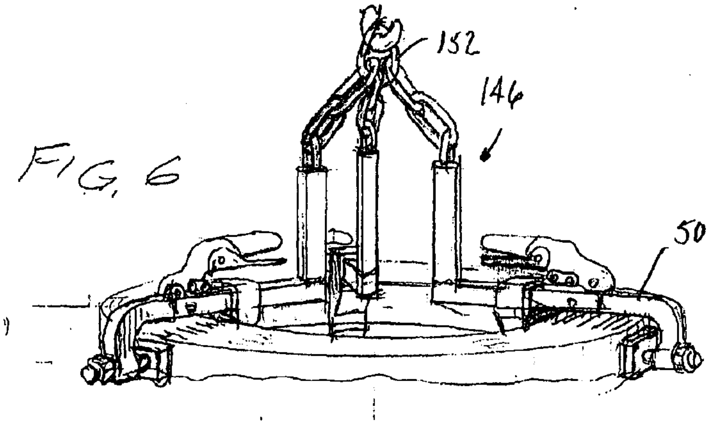
FIG. 6 is an alternate embodiment of the coil handler grasping assembly illustrated in FIGS. 1–3.
Figure 1:
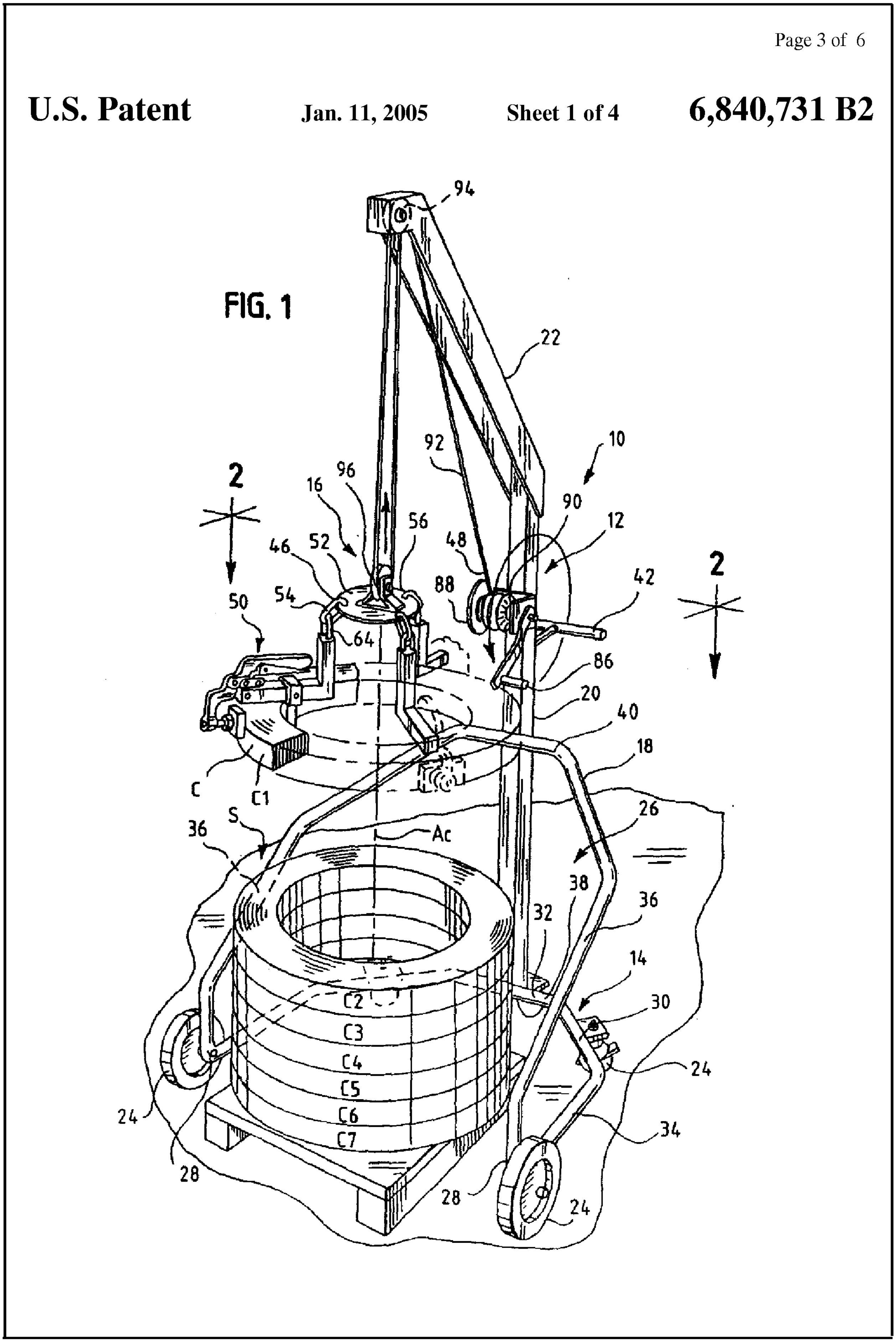
Figure 2:
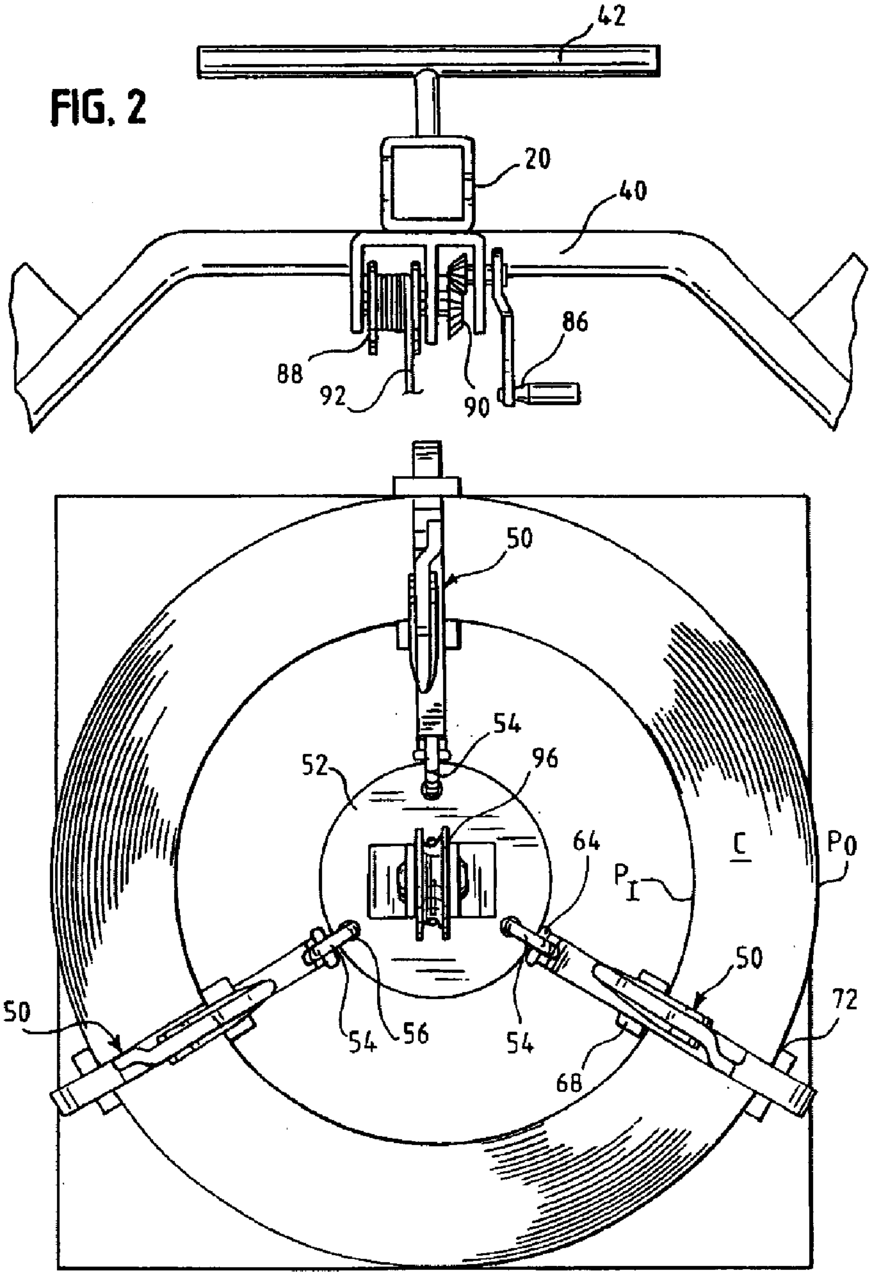

An alternate embodiment of the grasping assembly 146 is illustrated in FIG. 6. In this embodiment, the clamps 50, rather than connecting to a plate 52, are hung from a common link 152 that is secured to the lifting assembly cable 92. The clamping elements 50 are, however, the same as those elements of the embodiment of FIGS. 1 and 2. In this embodiment the coil C will, similar to the first embodiment, tend to "balance" with the coil C resting substantially vertically (that is the axis $A_C$ resting vertically), rather than shift so that the coil C comes to rest horizontally.

Figure 5:
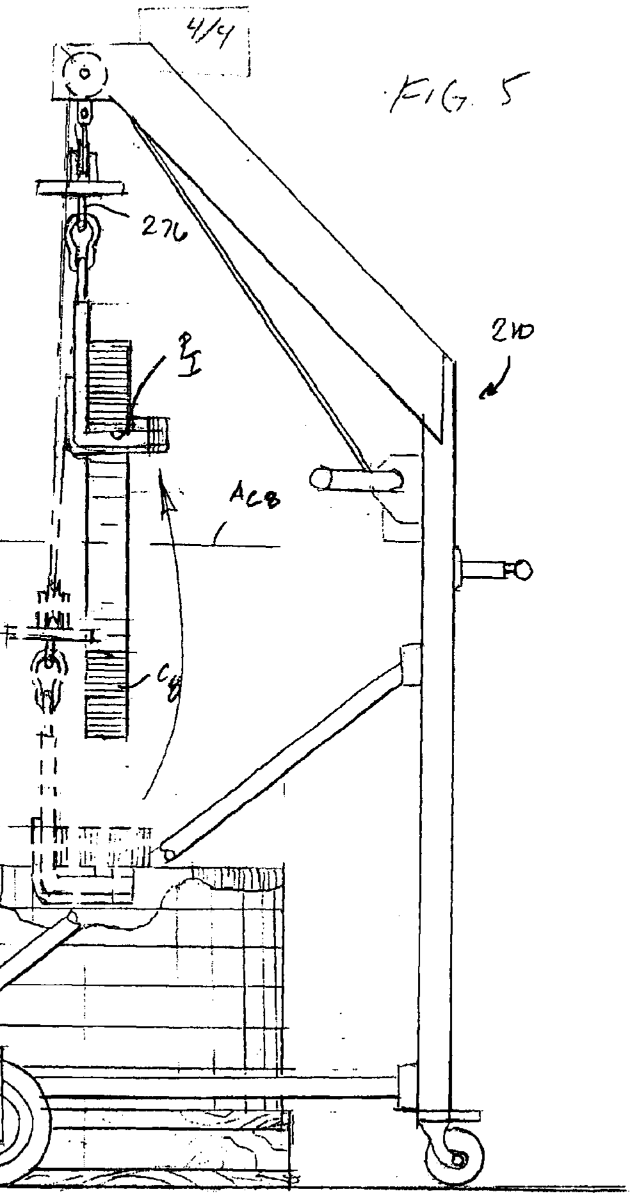
FIG. 5 is a side view of the handler having the grasping assembly of FIG. 5 with a coil loaded onto the assembly.

Still another enhancement to the handler 210 is illustrated in FIGS. 4–5. In this embodiment, the handler 210 includes a grasping assembly 246 that permits grasping and lifting coils $C_8$ that are oriented vertically, and reorienting the coils so that they are horizontally oriented. Such an orientation may be required for example, to load coils $C_8$ onto certain strapping machines.

This embodiment of the grasping assembly 246 includes a hook element 250 that is freely connected to the plate 252. The hook 250 includes a depending leg 260 and a transverse leg 262 extending from the depending leg 260. The transverse leg 262 can include a step or stop block 270 to more positively engage and hold the coil C on the leg 262. A head portion 274 of the transverse leg 262 can be tapered to permit more readily engaging the head 274 with the edge of the coil inner periphery $P_1$.

In a present embodiment, the hook 250 is connected to a closed link or eye portion 276 that is fastened to an underside of the plate 252. In this manner, the same grasping assembly plate 252 and cable 92 connection 96 can be used for either the clamping elements 50 or the hook element 250.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A coil handler device for grasping, lifting and transporting a coil of material, the material coiled in such a manner as to have an outer periphery and an inner periphery and defining a longitudinal axis, comprising:

a frame; and a grasping and lifting assembly including at least one clamping element having first and second clamping surfaces for engaging and securing the coil along a radial line at the inner and outer peripheries of the coil, a first clamp leg elongated in a direction along the radian line and a second clamp leg fixedly connected to the first clamp leg, the second clamp leg being transverse to the first clamp leg at a fit end, the second clamp leg having a second and operably connected to a lifting assembly for raising and lowering a coil secured by the clamping element, the grasping and lifting assembly including first and second clamp arms positioned along the first clamp leg for securing the coil at the inner and outer peripheries, the first clamp arm being spaced from the second clamp leg and the second clamp arm being intermediate the first clamp arm and the second clamp leg, wherein the grasping and lifting assembly includes a central spacing element and wherein the at least one clamping element is operably connected to the central spacing element.

2. The coil handler device in accordance with claim 1 including three clamping elements connected to the central spacing element, the clamping elements being equally radially spaced from one another.

3. The coil handler device in accordance with claim 1 wherein the at least one clamping element is operably connected to the central spacing element by a link to permit movement of the clamping element relative to the spacing element.

4. The coil handler device in accordance with claim 1 wherein the second clamp arm is fixed on the first clamp leg and wherein the first clamp arm is moveable toward and away from the second clamp arm to permit positioning the clamping element over the coil and locking the clamping element onto the coil.

5. The coil handler device in accordance with claim 1 wherein the grasping and lifting assembly includes a cable operably connected to the at least one clamping element for raising and lower the clamping element.

6. The coil handler device in accordance with claim 5 including a crank operably connected to the cable.

7. The coil handler device in accordance with claim 1 wherein the frame includes a carriage for moving the handler device.

8. The coil handler device in accordance with claim 7 including a plurality of wheels mounted to the carriage.

9. The coil handler device in accordance with claim 1 wherein the frame includes a base having an open end and an open central region, and wherein the at least one clamping element is positioned vertically above and about centrally of the open central region.

10. The coil handler device in accordance with claim 9 wherein the frame includes a boom and wherein the at least one clamping element is supported from the boom over the open central region.

11. A coil handler device for grasping, lifting and transporting a coil of material, the material coiled in such a manner as to have an outer periphery and an inner periphery and defining a longitudinal axis, comprising:

a frame; and a grasping and lifting assembly including three clamping elements each having first and second clamping surfaces for engaging and securing the coil along a radial line at the inner and outer peripheries of the coil, each clamping element further including a first clamp leg elongated in a direction along the radial line and a second clamp leg fixedly connected to the first clamp leg, the second clamp leg being transverse to the first clamp leg at a first end, the second clamp leg having a second end operably connected to a lifting assembly for raising and lowering a coil secured by the clamping elements, the grasping and lifting assembly including first and second clamp arm positioned along the first clamp leg for the coil at the inner and outer peripheries, the first clamp arm being spaced from the second clamp leg and the second clamp arm being intermediate the first clamp arm and the second clamp leg.

12. The coil handler device in accordance with claim 11 wherein the grasping and lifting assembly includes a central spacing element and wherein the clamping elements are operably connected to the central spacing element, equally radially spaced from one another, each of the clamping elements being operably connected to the central spacing element to permit movement of the clamping elements relative to the spacing element.

13. The coil handler device in accordance with claim 11, wherein the second clamp arm is fixed on the first clamp leg and wherein the first clamp arm is moveable toward and away from the second clamp arm to permit positioning the clamping element over the coil and locking the clamping element onto the coil.

14. The coil handler device in accordance with claim 11 wherein the frame includes a carriage having wheels for moving the handler device.

15. The coil handler device in accordance with claim 11 wherein the frame includes a base having an open end and an open central region, and wherein the clamping elements are positioned vertically above and about centrally of the open central region.

16. The coil handler device in accordance with claim 11 wherein the grasping and lifting assembly includes a cable operably connected to the clamping elements for raising and lower the clamping elements.

17. The coil handler device in accordance with claim 16 including a crank operably connected to the cable.

* * * * *

UNITED STATES PATENT AND TRADEMARK OFFICE
CERTIFICATE OF CORRECTION

PATENT NO. : 6,840,731 B2 
DATED : January 11, 2005
INVENTOR(S) : Figiel et al.

It is certified that error appears in the above-identified patent and that said Letters Patent is hereby corrected as shown below:

Title page illustrating figure(s) should be deleted, and substitute therefore, the title page illustrating figure(s). (attached)

Delete drawing sheets 1-4, and substitute therefore, drawing sheets 1-4. (attached)

<u>Column 7</u>,
Line 18, should read -- ...radial line and a second claim leg fixedly connected to the first clamp leg… --
Line 20, should read -- ...transverse to the first clamp leg at a first end, the second clamp… --
Line 53, should read -- ...raising and lowering the clamping element… --

<u>Column 8</u>,
Line 57, should read -- ...raising and lowering the clamping elements. --

Signed and Sealed this

Twenty-sixth Day of April, 2005

JON W. DUDAS
*Director of the United States Patent and Trademark Office*

(12) United States Patent
Figiel et al.

(10) Patent No.: US 6,840,731 B2
(45) Date of Patent: Jan. 11, 2005

(54) COIL HANDLER DEVICE

(75) Inventors: Janusz Figiel, Mundelein, IL (US); Alejandro L. Nocom, Lake Zurich, IL (US); John R. Hartnett, Kildeer, IL (US); Kenneth A. Hoffman, Deerfield, IL (US); Michael J. Brown, Palatine, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 34 days.

(21) Appl. No.: 10/315,724

(22) Filed: Dec. 10, 2002

(65) Prior Publication Data

US 2004/0109749 A1 Jun. 10, 2004

(51) Int. Cl.[7] .......................... B65G 7/00; G66F 11/00; B60B 29/00

(52) U.S. Cl. ....................................... 414/619; 414/426

(58) Field of Search ................................ 414/426, 427, 414/429, 619, 911

(56) References Cited

U.S. PATENT DOCUMENTS

| | | | | |
|---|---|---|---|---|
| 2,706,658 A | | 4/1955 | Jewell | |
| 2,817,450 A | | 12/1957 | Ulinski | |
| 2,823,948 A | | 2/1958 | Horton | |
| 2,951,725 A | | 9/1960 | St. Jean | |
| 3,044,647 A | | 7/1962 | Hopfeld | |
| 3,409,156 A | | 11/1968 | Mills | |
| 3,436,116 A | * | 4/1969 | Anderson | 414/626 |
| 3,734,328 A | * | 5/1973 | Dalglish | 414/911 |
| 4,029,230 A | | 6/1977 | Bolduc et al. | |
| 4,460,210 A | | 7/1984 | Miechur | |
| 4,515,522 A | | 5/1985 | Sonerud | |
| 4,531,771 A | | 7/1985 | Bullock | |
| 4,941,798 A | * | 7/1990 | Meier | 414/911 |
| 5,642,979 A | | 7/1997 | Cullen et al. | |
| 6,276,628 B1 | | 8/2001 | Focke et al. | |
| 6,648,580 B2 | * | 11/2003 | Lofgren | 414/619 |
| 2002/0054811 A1 | | 5/2002 | Lofgren | |

FOREIGN PATENT DOCUMENTS

| | | |
|---|---|---|
| WO | WO 93/09054 | 5/1993 |

* cited by examiner

*Primary Examiner*—Gene O. Crawford
(74) *Attorney, Agent, or Firm*—Mark W. Croll, Esq.; Donald J. Breh, Esq.; Welsh & Katz, Ltd.

(57) ABSTRACT

A coil handler device is configured for grasping, lifting and transporting a coil of material that is coiled in such a manner as to have an outer periphery and an inner periphery and to define a longitudinal axis. The handler device includes a frame and a grasping and lifting assembly. The grasping and lifting assembly includes at least one clamping element having first and second clamping surfaces for engaging and securing the coil along a radial line at the inner and outer peripheries of the coil. The clamping element includes a first clamp leg elongated in a direction along the radial line and a second clamp leg fixedly connected to the first clamp leg transverse to the first clamp leg at a first end. The second clamp leg has a second end operably connected to a lifting assembly for raising and lowering the coil when it is secured by the clamping element. The grasping and lifting assembly includes first and second clamp arms positioned along the first clamp leg for securing the coil at the inner and outer peripheries. The first clamp arm is spaced from the second clamp leg and the second clamp arm is intermediate the first clamp arm and the second clamp leg.

17 Claims, 4 Drawing Sheets

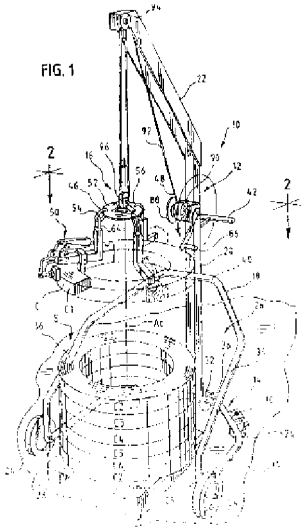

FIG. 1